United States Patent [19]

Matsuoka et al.

[11] Patent Number: 5,001,358

[45] Date of Patent: Mar. 19, 1991

[54] INTERFACE DEVICE

[75] Inventors: Kazushige Matsuoka, Mishima; Masayuki Mohri, Yamaga, both of Japan

[73] Assignee: Omron Tateisi Electronics Co., Kyoto, Japan

[21] Appl. No.: 311,954

[22] Filed: Feb. 17, 1989

[30] Foreign Application Priority Data

Feb. 19, 1988 [JP] Japan ............................ 63-20896
Feb. 19, 1988 [JP] Japan ............................ 63-20897

[51] Int. Cl.$^5$ ............................................ H04B 9/00
[52] U.S. Cl. ............................. 307/150; 307/151; 307/117; 455/606; 455/607
[58] Field of Search ................. 307/112, 38, 34, 150, 307/151, 140, 252 B, 203, 252 J; 323/325; 340/310 A, 310 R, 310 CP; 455/612, 602, 606, 603, 607, 608; 361/150-193

[56] References Cited

U.S. PATENT DOCUMENTS 4,691,296 9/1987 Struger .
4,736,116 4/1988 Paviak, Jr. et al. .

FOREIGN PATENT DOCUMENTS 2159987 12/1985 United Kingdom .

Primary Examiner—Paul Ip
Attorney, Agent, or Firm—Dickstein, Shapiro & Morin

[57] ABSTRACT

An interface device which is provided with a DC-DC converter and a power output terminal so that the internal circuit of the interface device and the external equipment may share a common power source in spite of their different power supply requirements, and the wiring connection between the interface device and the external equipment may be simplified. In particular, if the interface device is configured as a terminal base and coupled to the controller via serial transmission line, a significant simplification of the wiring between different parts of the controller system can be accomplished. If the power terminals include positive and negative power output terminals arranged in an alternating fashion, and the power terminals and the signal lead terminals are arranged in two different rows, preferably, in staggered relationship, the leads from different pieces of external equipment may be clustered close to each other, and the external wiring work is extremely simplified. This contributes to the elimination of wiring errors and the reduction in the cost of installing and controller system.

7 Claims, 11 Drawing Sheets

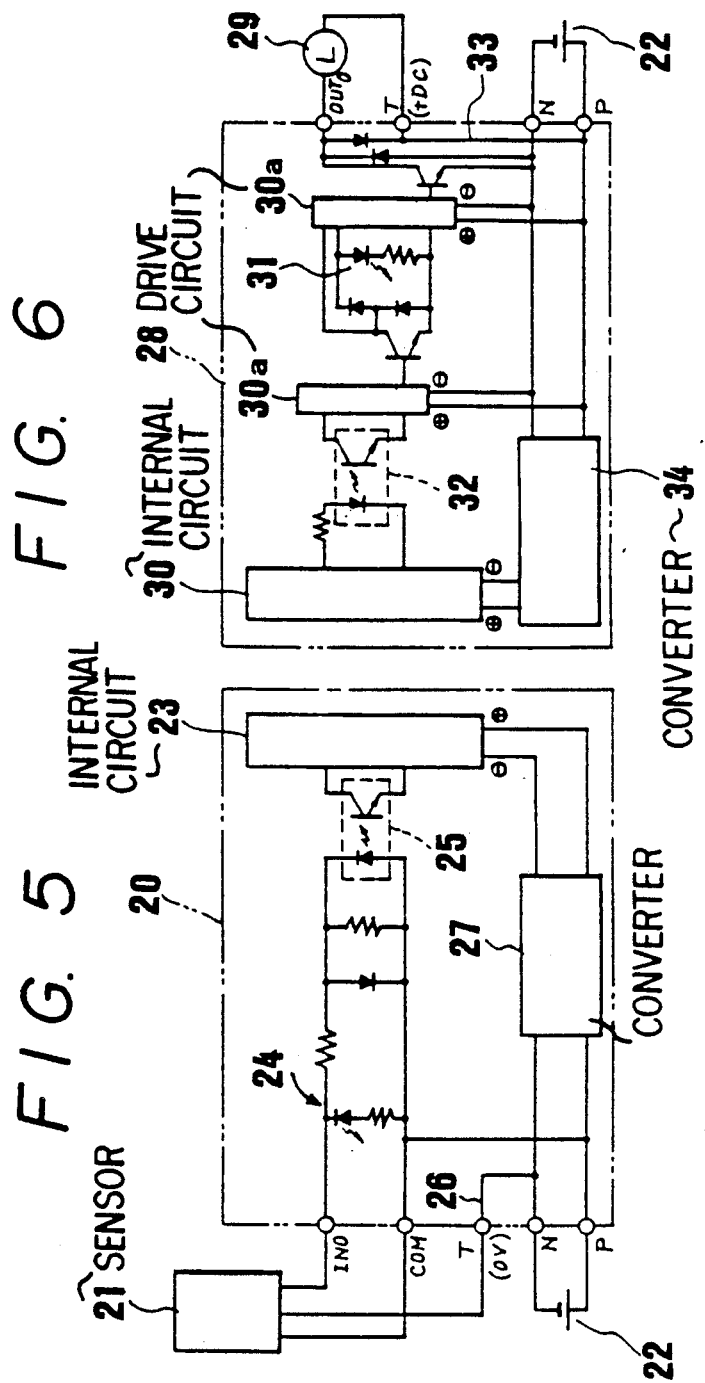

INTERFACE DEVICE

TECHNICAL FIELD

The present invention relates to interface devices which require less wiring work than prior art interface devices, and in particular to such interface devices which are suitable, but not exclusively, for use in input and output devices for programmable controllers.

BACKGROUND OF THE INVENTION

As shown in FIG. 1, a typical conventional input unit 1 for a programmable controller comprises input terminals INO and COM for connecting signal lines from a sensor 4, an LED indicator lamp 7 for indicating the presence of a signal, and an internal circuit 2 which is to be coupled to a programmable controller via signal lines not shown in the drawing, and receives input signals from the terminals INO and COM via a photo-coupler 2. The input unit 1 is further provided with terminals N and P for connecting a power source 6 for the internal circuit 3. The sensor 4 normally requires its own power source, but typically shares the power source 6 with the internal circuit 3 of the input unit 1. To accomplish the necessary wiring a terminal base 5 is used; this terminal base 5 is provided with two pairs of terminals N1 and P1, and N2 and P2, each pair being internally connected to each other, as shown in FIG. 1. The terminals N1 and P1 are connected to the different ends of the power source 6 while the terminals N2 and P2 are connected to the power input lines of the sensor 4 as well as to the common terminal COM of the input unit 1. In this way, the single power source can supply the necessary electric power to both the input unit 1 and the sensor 4, but a considerable external wiring work is necessary.

FIG. 2 shows a typical conventional output unit 8 which likewise comprises output terminals OUT and COM, a signal indicator lamp 14 consisting of an LED, and an internal circuit 9 which is coupled to the output terminals OUT and COM via photo-coupler 10. In this case, the load 11 consists of a lamp. The output unit 8 is further provided with a terminal +DC for receiving a DC power for the drive circuit 9a of the output unit 8. A single power source 13 supplies electric power to the internal circuit 9 as well as to the load 11 and the drive circuit 9a p of the output unit 8, but, again, a considerable external wiring work is required according to this conventional output unit 8.

According to a typical conventional arrangement of a programmable controller and interface devices, a programmable controller 15 and interface devices 16 are arranged in an upper part of the interior a control panel 14 adjacent to each other, and an elongated terminal base 18 having a plurality of screw-clamp type terminals is mounted on a lower part of the interior of the control panel 14 as shown in FIG. 3. And, they are connected together by multi-core cables 17.

In such a control system utilizing a programmable controller, the necessary wiring work is significant because a number of multi-core cables 17 must be passed inside the control panel 14, and a considerable wiring space is required.

Also in the case where the programmable controller 15 along with the interface devices 16 is centrally located, and the terminal bases 18 are distributed to various locations of a production line to which the programmable controller system is applied as shown in FIG. 4, the same situation exists, and a large number of multi-core cables must be passed between various parts of the controller system. Therefore, again, the wiring cost significantly increases the cost for the installation of the system, and a considerable space is required for the necessary wiring.

BRIEF SUMMARY OF THE INVENTION

In view of such problems of the prior art, a primary object of the present invention is to provide an interface device which is suitable for use with a programmable controller and can reduce the necessary wiring work.

A second object of the present invention is to provide an interface device of the aforementioned kind which requires less space for installation.

A third object of the present invention is to provide an interface device which can reduce the possibility of external wiring errors.

According to the present invention, these and other objects can be accomplished by providing: an interface device for interfacing a controller with external equipment in which the external equipment as well as the interface device individually requires a supply of electric power, comprising: a first power terminal to be connected to an external power source; a second power terminal to be connected to a power input line of the external equipment; a signal lead terminal to be connected to a signal line of the external equipment; a jumper line connecting the first power terminal to the second power terminal; and a power converter for converting the electric power supplied from the first power terminal to an electric power suitable for an internal circuit of the interface device and supplying it to the same.

Thus, not only the need to provide two different power sources is eliminated but also the external wiring of the interface device is simplified. In particular, if the interface device is configured as a terminal base and coupled to the controller via serial transmission line, a significant simplification of the wiring between different parts of the controller system can be accomplished.

If the second power terminals comprise positive and negative power output terminals arranged in an alternating fashion and the second power terminals and the signal lead terminals are arranged in two different rows, preferably, in staggered relationship, the leads from different pieces of external equipment may be clustered close to each other, and the external wiring work is extremely simplified. This contributes to the elimination of wiring errors and the reduction in the cost of installing the controller system.

BRIEF DESCRIPTION OF THE DRAWINGS

Now the present invention is described in the following with reference to the appended drawings, in which:

FIG. 5 is a circuit diagram showing a part of the internal structure and the external wiring of an input unit for use with a programmable controller according to the present invention;

FIG. 6 is a diagram similar to FIG. 5 showing an output unit for use with a programmable controller according to the present invention;

DESCRIPTION OF THE PREFERRED EMBODIMENTS

Figure 1:
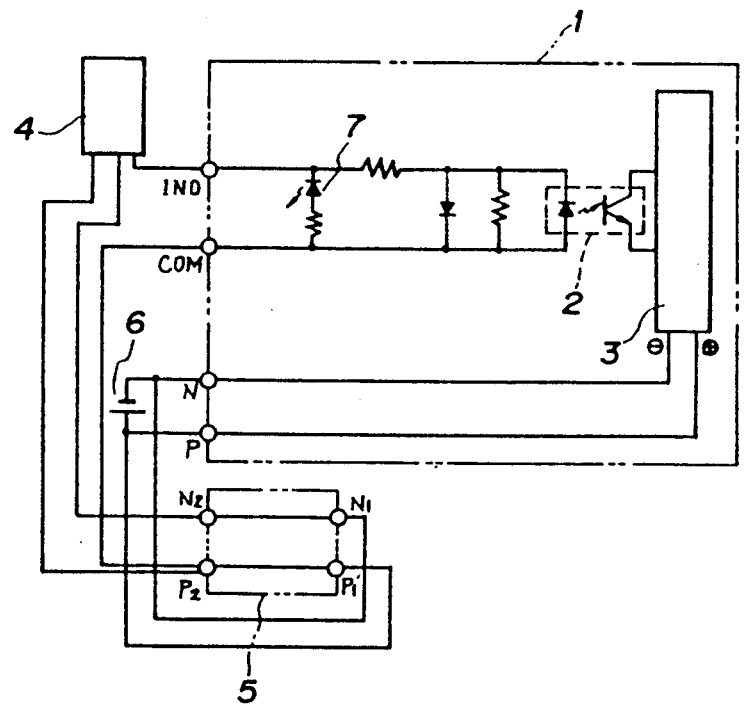
FIG. 1 is a circuit diagram showing a part of the internal structure and the external wiring of a conventional input unit for use with a programmable controller.
Figure 2:
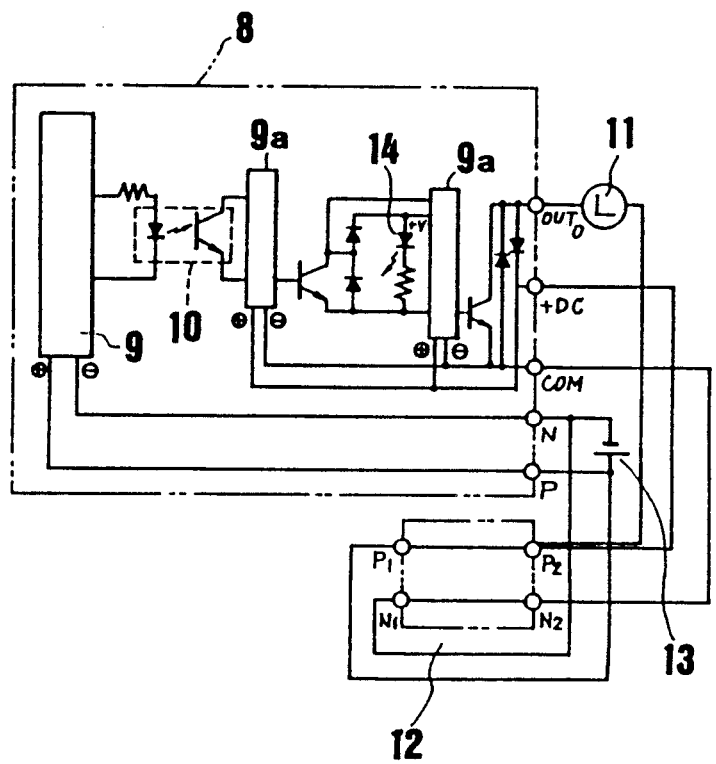
FIG. 2 is a diagram similar to FIG. 1 showing a conventional output unit for use with a programmable controller.
Figure 3:
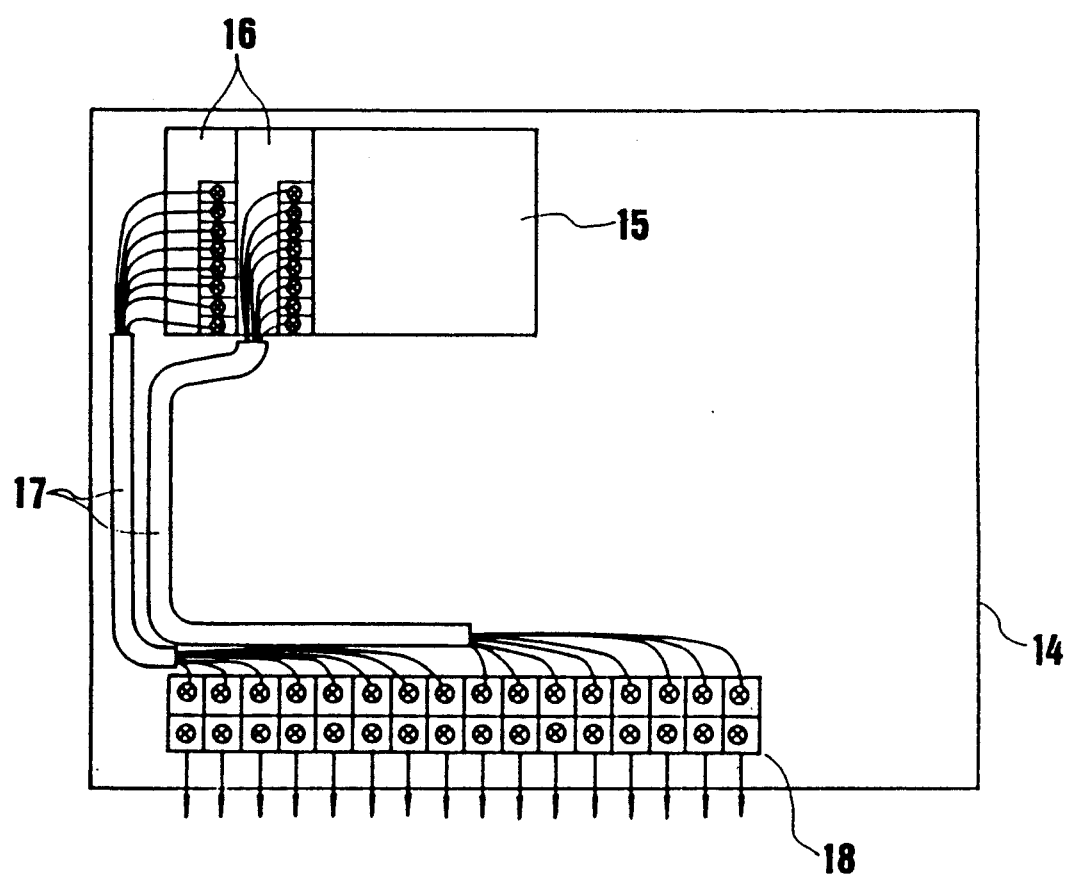
FIG. 3 is a conventional lay-out of a programmable controller, interface devices and a terminal base in the interior of a control panel.
Figure 4:
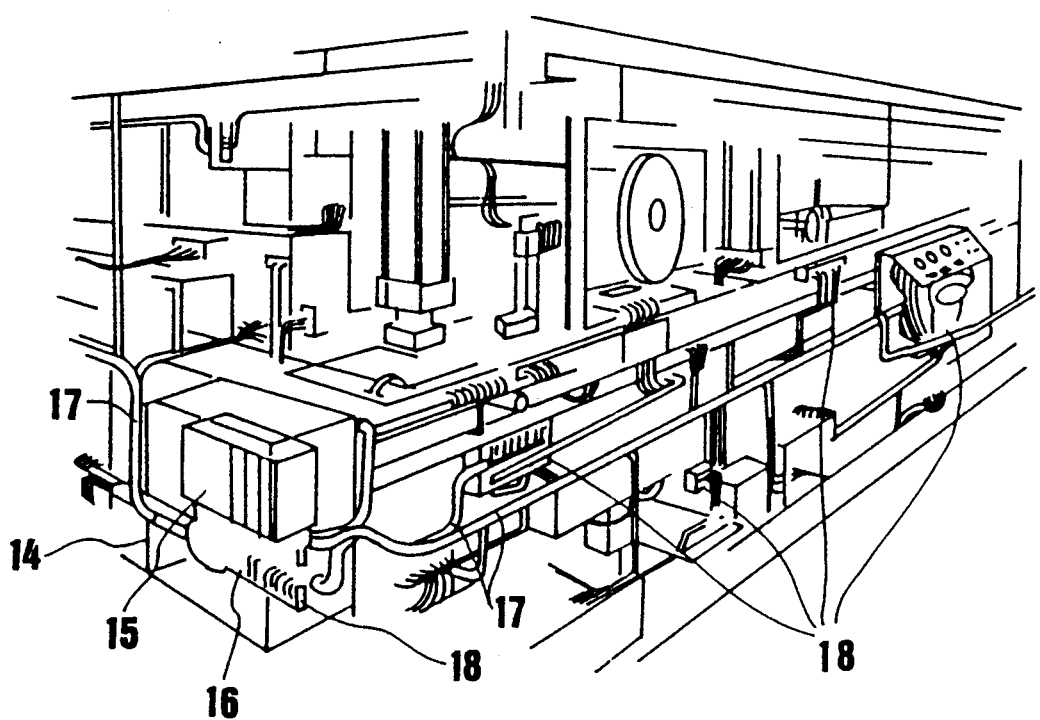
FIG. 4 is a perspective view of a conventional arrangement of a programmable controller system in a production line.

FIG. 5 shows a first embodiment of the interface device according to the present invention which is constructed as an input unit for a programmable controller. This input unit 20 comprises terminals INO and COM for connecting signal lines from a sensor 21 which has three lead wires in this case, a terminal T for connecting a power supply line of the sensor 21, and a pair of power input terminals N and P for connecting a power source 22. The input unit 20 is internally provided with an internal circuit 23, an LED signal indicator, 24 and a photo-coupler 25 interposed between the signal input terminals INO and COM and the internal circuit 23. The terminals T and N are internally connected to each other by a jumper line 26 for supplying electric power from the power source 22 to the sensor 21. Further, the power for the internal circuit 23 is also derived from the same power source 22, however, via a DC—DC converter 27 which converts the voltage from the power source 22, which may be 24 volts DC, into the voltage, for instance 5 volts DC, which is suitable for the internal circuit 23. The DC—DC converter 27 electrically separates its input and output ends from each other.

In the above described structure, the necessary wiring of the power lines simply consisted of connecting the external DC power source 22 to the power source input terminals P and N, and the power lead of the sensor 21 to the power source output terminal T, where the terminal COM is common to the signal and the power lines for the sensor 21. Thus, the terminal base 5 which was necessary in the conventional device has become unnecessary. And, the amount of external wiring is drastically reduced, and the necessary wiring work is significantly simplified.

FIG. 6 shows a second embodiment of the interface device according to the present invention which is constructed as an output unit 28 for a programmable controller. This output unit 28 comprises terminals OUT and T for connecting drive signal lines leading to a load 29 which, in this case, consists of a lamp, and a pair of power input terminals N and P which are connected to a power source 22. The output unit 28 is internally provided with an internal circuit 30, an LED signal indicator 31 and a photo-coupler 32 interposed between the drive signal output terminals OUT and T and the internal circuit 30. The terminals T and P are internally connected to each other by a jumper line 33 for supplying electric power from the power source 22 to the load 29. The electric power from the power source 22 is also directly supplied to various parts of the drive circuit 30a of the output unit 28. Further, the power for the internal circuit 30 is also derived from the same power source 22, however, via a DC—DC converter 34 which converts the voltage (24 volts DC) from the power source 22 which is suitable for the load 29 and the drive circuit 30a to the voltage (5 volts DC) which is suitable for the internal circuit 30.

In the above described structure, the necessary wiring of the power lines simply consisted of connecting the external DC power source 29 to the power source input terminals P and N, where the terminal T is common to the signal and the power lines of the load 28.

Thus, the terminal base 12 which was necessary in the conventional device has become unnecessary. And, the amount of external wiring is drastically reduced, and the necessary wiring work is significantly simplified.

In the input and output units 20 and 28 shown in FIGS. 5 and 6, since the power source lines for the internal circuits 23 and 30 are not passed externally of the units, they are less subject to external noises.

Figure 7:
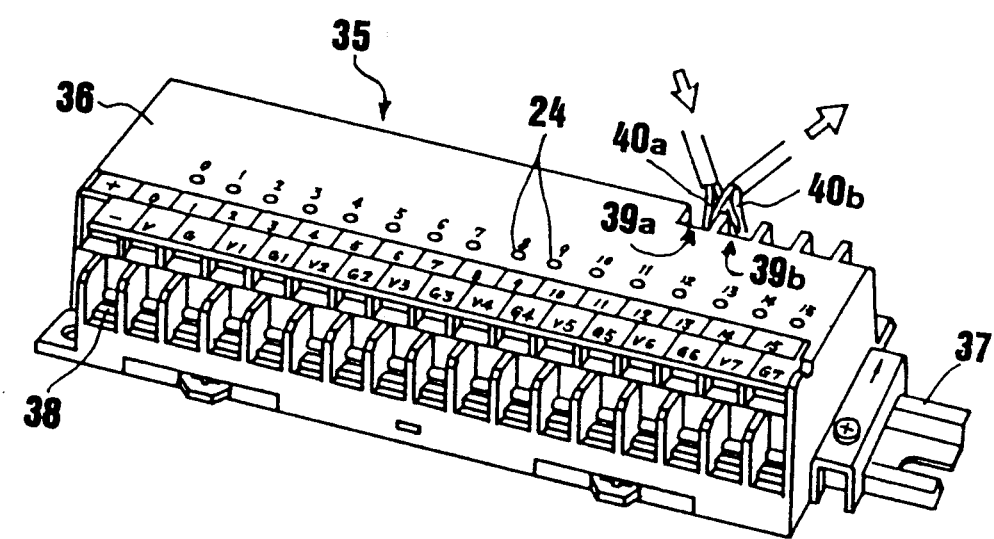
FIG. 7 is a perspective view of an interface device according to the present invention which is incorporated with a terminal base.

FIG. 7 shows the external appearance of an interface device 35 incorporating a plurality of input units, each of which may consist of an identical unit such as the input unit 20 shown in FIG. 5. The interface device 35 may comprise a plurality of output units or may also comprise a mixture of input and output units. This interface device 35 comprises a housing 36 which is shaped like a terminal base, and is adapted to be mounted on a DIN rail 37 in any desired manner. The upper surface of the housing 36 is provided with a row of LED lamps 24 along the lengthwise direction of the housing 36 for indicating the presence of input signals, and the connections thereto can be accomplished by screw clamp type terminals 38 arranged along the front end of the housing 36.

The housing 36 is internally incorporated with a communication LSI, and the wiring from the programmable controller thereto may consist of two lines 40a and 40b connected to the screw clamp type terminals 39a and 39b provided in the rear end of the housing 36 for serial signal transmission.

Figure 8:
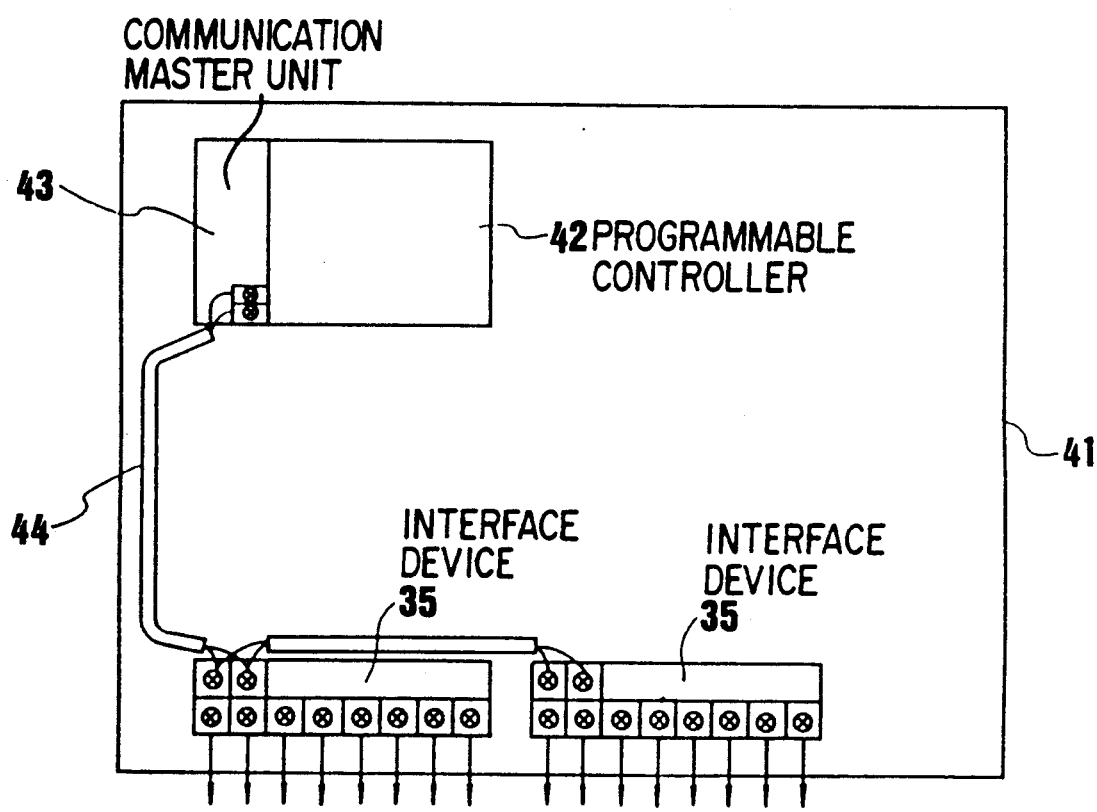
FIG. 8 shows a lay-out of a programmable controller, interface devices and terminal bases in the interior of a control panel according to the present invention.

Therefore, as shown in FIG. 8, it is possible to accommodate one or more interface devices (two in the embodiment illustrated in FIG. 8) 35 in a control panel 41 in the same way as conventional terminal bases, and, additionally, can be coupled to a programmable controller 42 via a communication master unit 43 which is attached to the controller 42. Since the communication cable 44 between the communication master unit 43 and the interface devices 35 may consist of a two-wire communication line 44, a drastic reduction in the amount of necessary wiring work can be accomplished.

Figure 9:
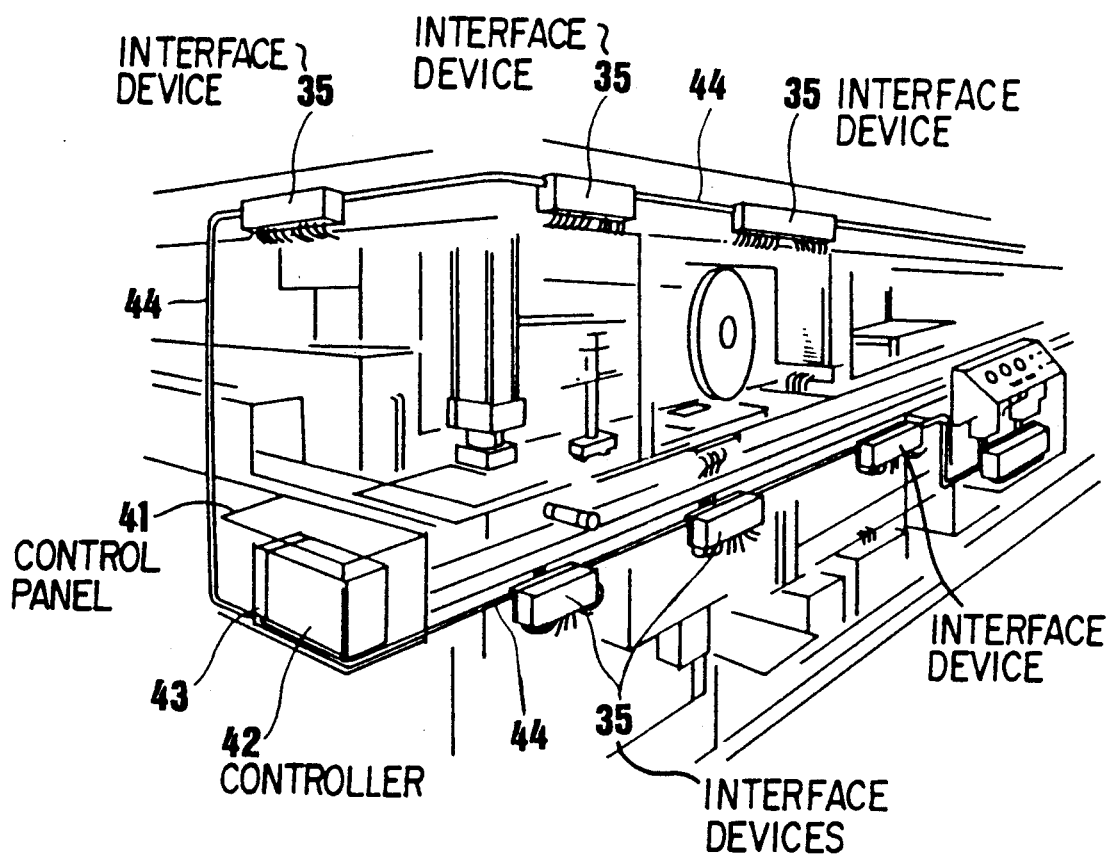
FIG. 9 is a perspective view of an arrangement of a programmable controller system in a production line according to the present invention.

Even further, as shown in FIG. 9, a plurality of such interface devices 35 which are configured as terminal bases as shown in FIG. 7 may be distributed to various parts of a production line. In this case, an even further reduction in the amount of wiring may be accomplished, and the cost for installation of such control systems can be drastically reduced.

Figure 10:
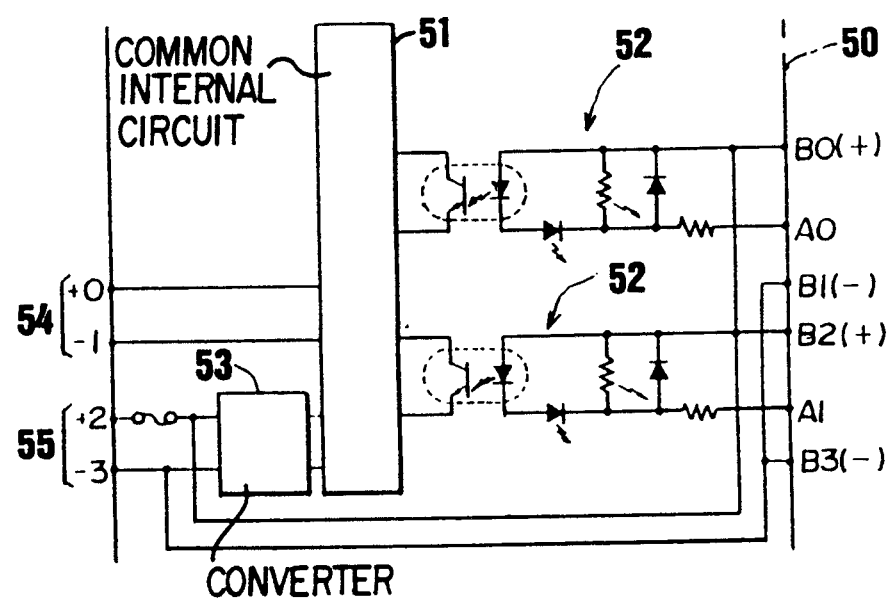
FIG. 10 is a circuit diagram of an interface device incorporating a plurality of input units according to the present invention.
Figure 11:
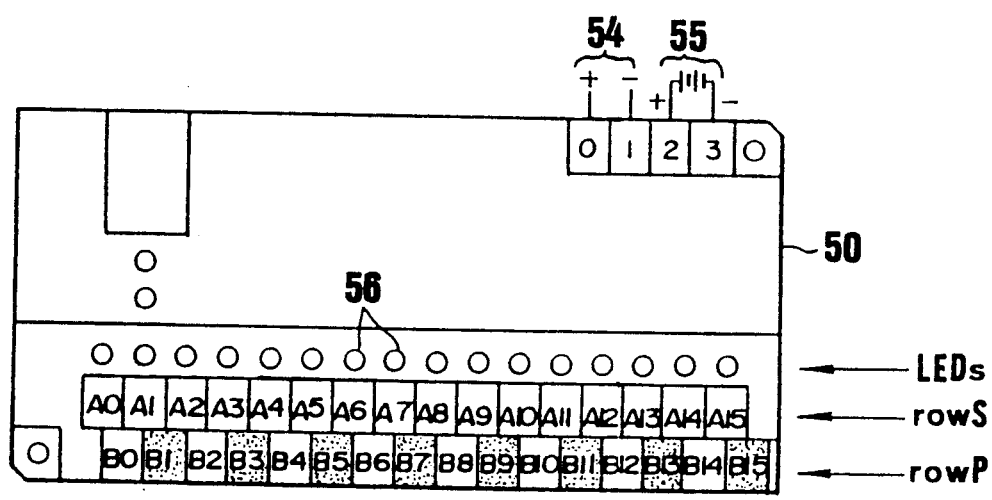
FIG. 11 is a plan view of the arrangement of the terminals for the interface device shown in FIG. 12.

FIG. 10 shows an interface device 50 incorporating a large number (for instance, 15) of input units 52 which are connected to a common internal circuit 51 although only two input units are illustrated. The internal circuit 51 exchanges control signals with a programmable controller via a pair of terminals 54 and receives a supply of electric power via terminals 55 and a DC—DC converter 53. Each of the control units 52 receives a supply of electric power directly from the terminals 55. As shown in FIG. 11, the terminals leading to the input units 52 are arranged in two rows P and S, in a staggered relationship and at an equal interval, along the front end of the interface device 50.

As can be seen from the circuit diagram of FIG. 10, to each of the input units 52 is associated a signal input terminal A0, A1, A2, ..., A15, a positive power output terminal B0, B2, ..., B14, and a negative power output terminal B1, B3, ..., B15, and the positive power output terminals B0, B2, ..., B14, are common to the other ends of the signal input terminals. The positive power output terminals B0, B2, ..., B14, and the negative power output terminals B1, B3, ..., B15 are also common within the positive and the negative power output terminal groups, respectively. And the signal input terminals A0, A1, A2, ..., A15, are arranged along the row S and the power output terminals B0, B1, B2, ..., B15, are arranged along the row P so that the positive and negative power output terminals alternate. Adjacent each of the signal input terminals A0, A1, A2, ..., A15 is arranged a corresponding LED indicator 56 for indicating the presence of a signal in the terminal.

Figure 12:
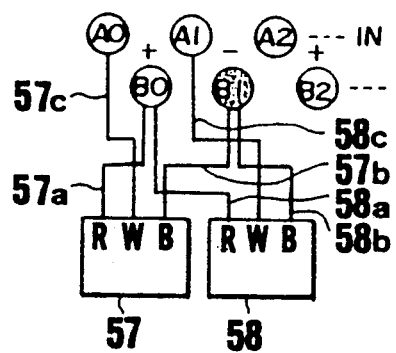
FIGS. 12 through 13 show different ways of using the terminals of the interface device shown in FIG. 10.

FIG. 12 shows how three-lead sensors 57, 58 may be connected to the terminals. Each of the sensors 57, 58 is provided with a red lead 57a, 58a which is to be connected to a positive power output terminal, a black lead 57b, 58b which is to be connected to a negative power output terminal, and a white lead 57c, 58c which is to be connected to a signal input terminal. As can be seen from FIG. 12, the power output terminals are each shared by a pair of adjacent sensors 57, 58. Since the leads 57a, 57b and 57c of each of the sensors 57 are connected to adjoining terminals, for instance A0, B0 and B1 in the case of the sensor 57, the wiring is simplified and the possibility wiring errors is eliminated. In particular, because the negative power output terminals or odd numbered power output terminals B1, B3, ..., B15 are distinctly marked by a suitable color, distinction of the terminals is easy. Thus, the wiring work can be made easily and substantially without any risk of making errors.

Figure 13:
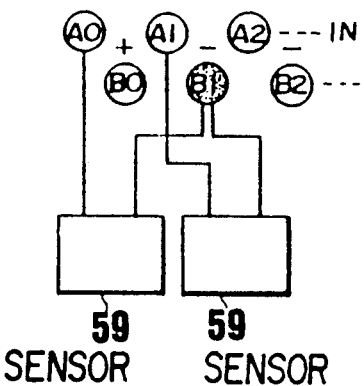

When the sensors 59 require only the positive power output terminals B1, B3, ..., B15 as shown in FIG. 13, the negative power output terminals or even numbered power output terminals B0, B2, ..., B14, may be disregarded, and the above mentioned advantages can still be obtained.

Figure 14:
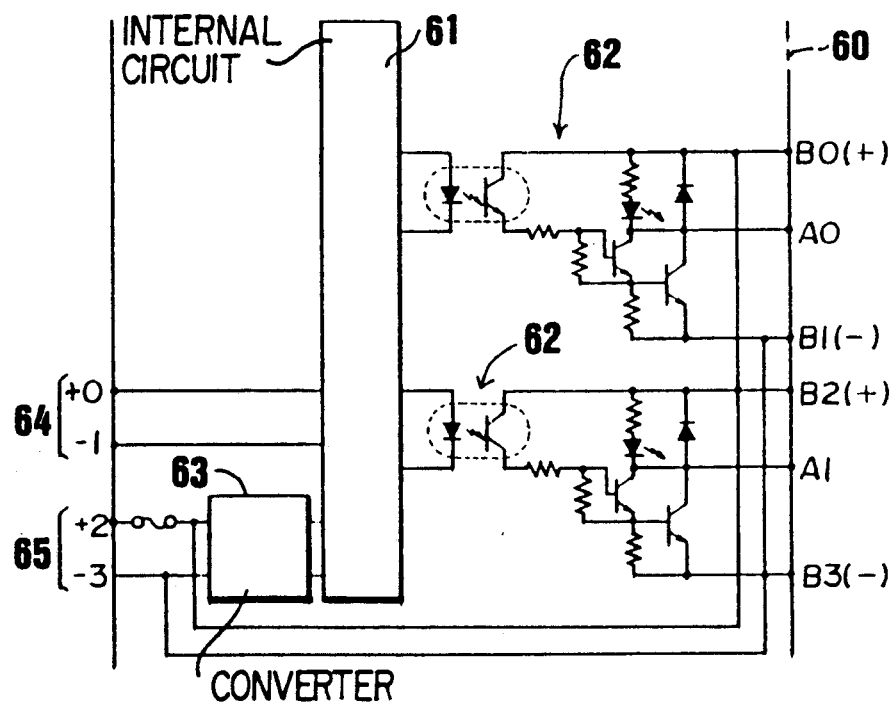
FIG. 14 is a circuit diagram of another interface device incorporating a plurality of output units according to the present invention.

FIG. 14 shows an interface device 60 incorporating a plurality of output units 62 which are connected to a common internal circuit 61. The internal circuit 61 exchanges control signals with a programmable controller via a pair of terminals 64 and receives a supply of electric power via terminals 65 and a DC—DC converter 63. Each of the output units 62 receives supply of electric power directly from the terminals 65 for their drive circuits. The terminals may be arranged in the same way as the interface device 50 illustrated in FIG. 11.

Figure 15:
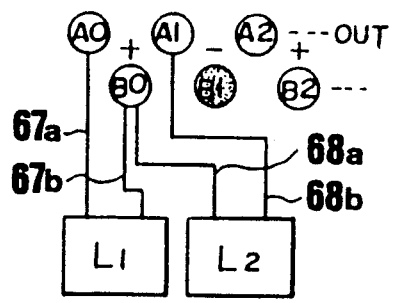
FIGS. 15 and 16 show different ways of using the terminals of the interface device shown in FIG. 14.

As can be seen from the circuit diagram of FIG. 14, to each of the output units 62 is associated a signal output terminal A0, A1, A2, ..., A15, a positive power output terminal B0, B2, ..., B14, and a negative power output terminal B1, B3, ..., B15, and the positive power output terminals B0, B2, ..., B14, are common to the other ends of the signal output terminals. The positive power output terminal B0, B2, ..., B14, and the negative output terminals B1, B3, ..., B15 are also common within the positive and the negative power output terminal groups, respectively. And the signal output terminals A0, A1, A2, ..., A15, are arranged along the row S and the power output terminals B0, B1, B2, ..., B15, are arranged along the row P so that the positive and negative power output terminals alternate. Adjacent each of the signal output terminals A0, A1, A2, ..., A15 is arranged a corresponding LED indicator for indicating the presence of a signal in the terminal. FIG. 15 shows how two-lead loads L1, L2, ... may be connected to the terminals. Each of the loads L1, L2, ... is provided with a first lead 67a, 68a which is to be connected to a signal output terminal and a second lead 67b, 68b which is to be connected to a positive power output terminal. As can be seen from FIG. 15, the positive power output terminals are each shared by a pair of adjacent loads L1, L2, ... . Since the leads 67a, 68a and 67b, 68b of each of the loads L1, L2, ... are connected to adjoining terminals, for instance A0 and B0 in the case of the load L1, the wiring is simplified and the possibility wiring errors is eliminated. In particular, because the negative power output terminals or odd number power output terminals are marked, distinction of the terminals is easy. Thus, the wiring work can be made easily and substantially without any risk of making errors.

Figure 16:
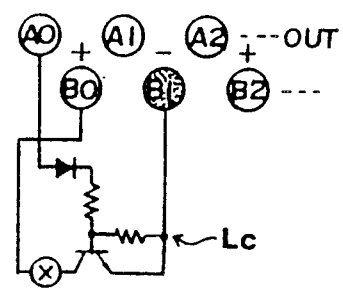

FIG. 16 shows a circuit load Lc which is required to be connected to both the positive and negative power output terminals as well as to the signal output terminal. Therefore, although only one such circuit load is illustrated in FIG. 16, a plurality of such circuit loads may be connected to the terminals substantially in the same manner as the three-lead sensors 57, 58 shown in FIG. 12, and similar advantages can be obtained.

What we claim is:

1. An interface device for interfacing a controller with external equipment wherein said external equipment and said interface device individually require a supply of electric power, said interface device comprising:
   an internal circuit;
   a first power terminal adapted to be connected to an external power source;
   a second power terminal adapted to be connected to a power input line of said external equipment;
   a signal lead terminal adapted to be connected to a signal line of said external equipment;
   a jumper line interconnecting said first power terminal and said second power terminal; and
   a power converter interconnecting said first power terminal and said internal circuit and for converting electric power supplied from said first power terminal to electric power suitable for said internal circuit.

2. An interface device as defined in claim 1, wherein the interface device comprises a plurality of interface units comprising a plurality of signal lead terminals, said signal lead terminals and associated ones of said second power terminals being arranged in two different rows.

3. An interface device as defined in claim 2, wherein said second power terminals and said signal lead terminals are arranged at equal intervals and in mutually staggered relationship along said rows.

4. An interface device as defined in claim 3, wherein said second power terminals comprise positive and negative power output terminals arranged in an alternating fashion.

5. An interface device as defined in claim 1, wherein said interface device is coupled to a controller via a serial transmission line.

6. A interface device as defined in claim 5, wherein said interface device and said controller are accommodated in a common control panel.

7. An interface device as defined in claim 5, wherein a plurality of said interface devices are arranged remote from said controller.

* * * * *